United States Patent [19]

Pennace

[11] Patent Number: 5,296,949
[45] Date of Patent: Mar. 22, 1994

[54] OPTICAL AUTHENTICATION DEVICE

[75] Inventor: John R. Pennace, Paxton, Mass.

[73] Assignee: FLEXcon Company Inc., Spencer, Mass.

[21] Appl. No.: 872,055

[22] Filed: Apr. 23, 1992

[51] Int. Cl.⁵ .......................... G03H 1/22; B41F 1/12
[52] U.S. Cl. .......................................... 359/2; 359/31; 359/32; 359/33; 359/567; 359/576; 427/7; 427/162
[58] Field of Search .................. 427/7, 162; 350/3.61, 350/3.70; 359/2, 3, 32, 31, 33, 567, 576

[56] References Cited

U.S. PATENT DOCUMENTS

| | | |
|---|---|---|
| 4,033,059 | 7/1977 | Hutton et al. ............................ 427/7 |
| 4,315,665 | 2/1982 | Haines ................................. 350/3.61 |
| 4,522,670 | 6/1985 | Caines ..................................... 427/7 |
| 4,662,653 | 5/1987 | Greenaway ............................. 427/7 |
| 4,840,444 | 6/1989 | Hewitt ................................. 350/3.85 |
| 4,892,385 | 1/1990 | Webster ................................. 427/7 |

Primary Examiner—Janyce Bell
Attorney, Agent, or Firm—Samuels, Gauthier & Stevens

[57] ABSTRACT

An optical device for receiving incident light having a minimum wavelength, and for producing a resultant light containing an optical image. The device includes a first material having a first index of refraction and a surface embossed with an optical interference pattern, and a second material having a second index of refraction deposited onto the embossed surface of the first material. The depth of deposition is at least equal to three quarters of the minimum wavelength component of the incident light within the second material.

20 Claims, 2 Drawing Sheets

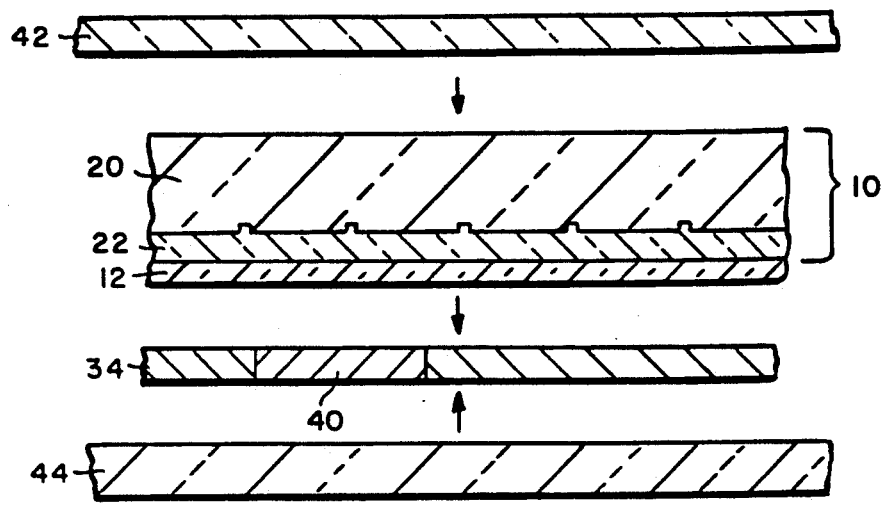
FIG. 4
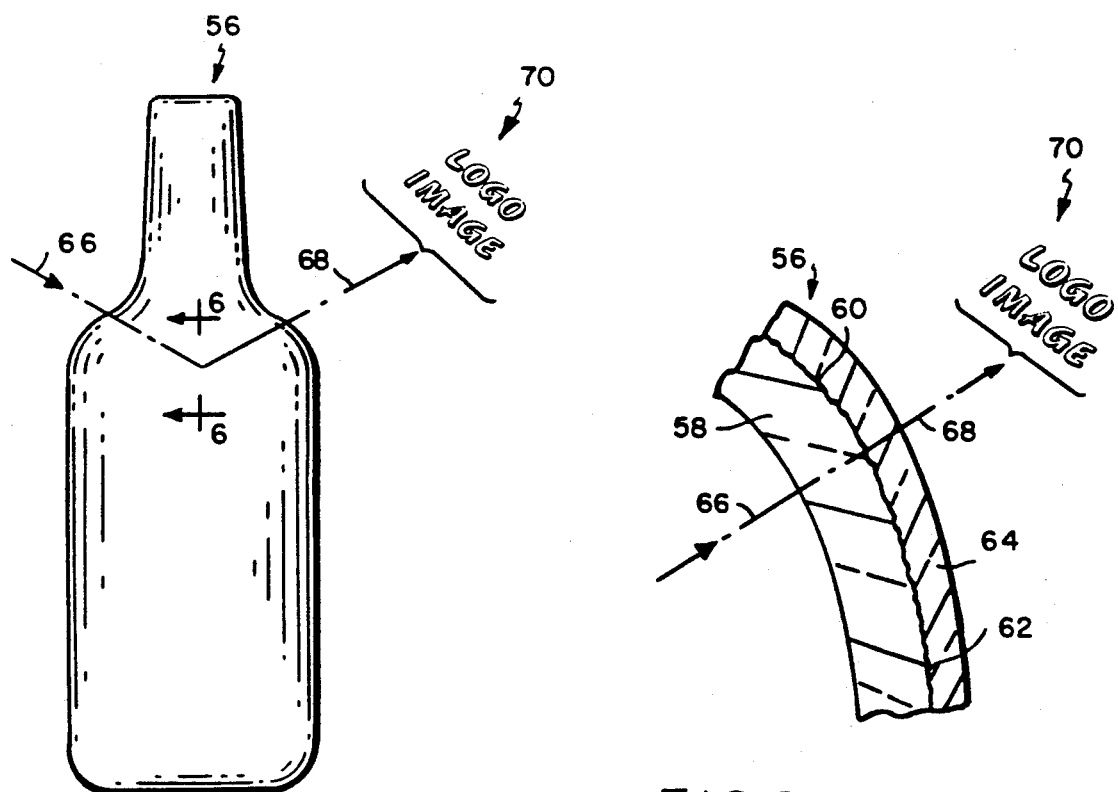
FIG. 5
FIG. 6

OPTICAL AUTHENTICATION DEVICE

BACKGROUND OF THE INVENTION

The invention relates to optical devices for receiving incident light and for producing resultant light containing optical images. More particularly, the invention relates to optical devices in which the optical image contains information concerning the genuineness of a document or item.

Photocopy reproduction technologies have made significant developments in the last decade. These developments have improved the quality of reproductions as well as lowered the costs of reproducing documents. As a consequence, it has become increasingly easier for those inclined to produce counterfeit documents to do so. Relatively inexpensive photocopy machines can today produce high quality color copies which may not be discernable from their originals.

As a security measure, authenticating means are now incorporated into official documents to foil would-be counterfeiters. For example, negotiable instruments, currency papers, etc., might include optical patterns which can be seen only with infrared or ultraviolet light; and identification or validation cards might include optical interference patterns for producing optical images in the visible, ultraviolet or infrared spectrums.

Producing official documents having optical interference patterns, such as holographic embossings, is a favored technique because such patterns are difficult to duplicate. Typically however, official documents with such authenticating means are expensive to produce in large quantities. A significant portion of this cost is due to the fact that embossed optical interference patterns must be protected from damage during handling, storage and use.

For example, surface embossing techniques, such as are disclosed in U.S. Pat. No. 4,250,217, generally result in an external polymeric surface embossed material. The embossment on such a device is vulnerable to dirt particles and other foreign substances which might damage the embossed relief pattern. Not only could such particles absorb some incident light (thus rendering the polymeric material less translucent), but such substances could also destroy the embossed relief pattern by eroding or abrading it.

Prior art techniques for protecting embossments include excavating an optical pattern through a non-absorbing coating. For example, U.S. Pat. No. 4,626,445 discloses surface excavation techniques as well as the excavation of an optical pattern 1) through a substantially non-absorbing coating, and 2) through a substantially non-absorbing substrate. These techniques, however, are costly and time consuming.

There is thus a conflict between the need to produce official documents which are difficult to copy yet which can be mass-produced inexpensively.

Accordingly, it is an object of the present invention to provide an optical authentication device which is relatively inexpensive to manufacture yet difficult for others to duplicate. A related objective of the present invention is the provision of means for inexpensively preserving films containing surface embossed interference patterns.

SUMMARY OF THE INVENTION

These and other objects and advantages are achieved in the present invention with the use of a plasma deposited material with a first index of refraction deposited onto an embossed polymeric material with a second index of refraction different from said first index of refraction. The embossment is used to form an optical image which may be viewed for authentication purposes. The minimum depth of deposition of the second material is related to the incident light and the second index of refraction. Specifically, the depth of deposition is at least equal to three quarters of the minimum wavelength component of the incident light within the second material.

An adhesive film may be applied to either the polymeric material or the plasma deposited material. This allows inexpensive embossing techniques to be employed in mass production applications. The adhesive film may then be used to bond the optical device onto another item to provide an optical authentication means.

BRIEF DESCRIPTION OF THE DRAWINGS

FIG. 4 is an exploded cross-sectional view of the materials used to form the item shown in FIG. 2;

FIG. 5 is a diagrammatic side view of a another item made from a different embodiment of the optical device of the invention; and FIG. 6 is a cross-sectional view on an enlarged scale of the item shown in FIG. 5 taken along line 6—6 of FIG. 5.

DETAILED DESCRIPTION OF A PREFERRED EMBODIMENT

The present invention is directed towards protecting surface embossed optical interference patterns, and specifically for providing coatings on embossed optical interference patterns.

Protecting a surface embossed pattern with a coating is difficult due to the optical properties of commonly used materials. Because optically dense materials, such as glass, are difficult to emboss, it is desirable to emboss polymeric materials, which are less optically dense. Unfortunately this presents significant material limitations for the coating. The present invention provides cost effective solutions to these limitations. These limitations, as well the solutions of the present invention, are discussed below.

Figure 1:
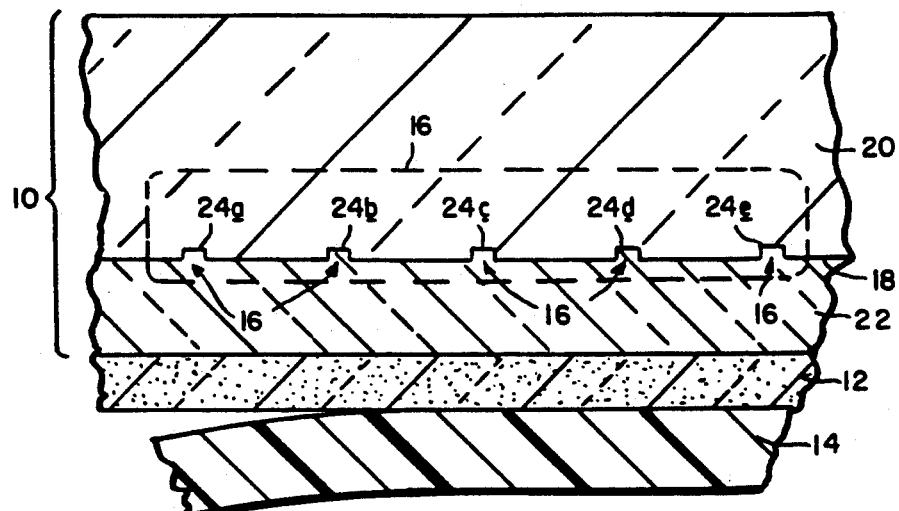
FIG. 1 is a cross-sectional view of an optical device of the invention.

FIG. 1 shows one embodiment of an optical device 10 of the present invention together with an adhesive material 12 applied to one side of the device 10. The adhesive material 12 is temporarily covered with a release material 14. The optical device 10 includes an optical interference pattern 16 which is embossed into a surface 18 of a first material 20, and is subsequently coated with a second material 22. The adhesive third material 12 is then applied to the optical device 10. The dimensions of the materials as shown are exaggerated for illustration purposes.

The optical interference pattern 16 could be a diffraction grating or an embossed holographic pattern in various embodiments of the invention. The optical interference pattern 16 shown in FIGS. 1-4 is a diffraction grating containing grooves illustrated at 24a-e. The grooves are evenly cut into the first material about 0.015 inches apart, and to a minimum depth of approximately 0.0000001 inches. In the embodiment of FIGS. 1-4, the interference pattern consists of grooves cut in a linear fashion. Alternatively, however, grooves could be cut in a radial format, somewhat like the concentric grooves of a phonographic record album.

Suitable materials for surface embossing include polymeric materials such as polyester, polypropylene, or polyvinylchloride, and/or acrylic materials. In the present embodiment a polymeric material having an index of refraction of 1.45 is used. The surface embossed material 20 may itself be a film or a coating on some other base material.

In the present embodiment, it is preferred that the coating material 22 be optically dense, transparent and susceptible to being plasma deposited at relatively low temperatures. Glass materials can be used, however, many glass materials require high temperatures for deposition. In the present embodiment, doped silicon dioxide ($SiO_2$) is used. The $SiO_2$ may be doped, for example, with titanium dioxide or barium sulfate. Silicon dioxide is a preferred ingredient in the coating material 22 of the present invention because it is relatively transparent, it deposits relatively easily, and it may be doped to achieve a high index of refraction (1.7-1.8). The plasma (ionized gas) deposition may be achieved with the aid of radio frequency (RF) stimulation. Alternatively, plasma chemical vapor deposition techniques, as well as sputtering deposition techniques may be employed. Moreover, pure $SiO_2$, as well as other materials, which vaporize at different temperatures and pressures, may be used.

The coating material 22 should fill each of the embossed grooves 24a-e, and must be deposited to a minimum thickness. The present invention produces an optical image in the visible light range (4000 Å to 7000 Å) and uses a coating material 22 having an index of refraction of about 1.75. The minimum thickness required of the coating material 22 has been found to be 1714 Å.

The depth of 1714 Å is required to at least allow the violet light (with a wavelength of about 4000 Å) to form its component of the optical image. A depth of 3000 Å would allow all of the colors of light to form their respective components of the optical image. A deposition depth of at least 3000 Å is preferred for optical devices which produce multi-color optical images. These determinations rely, in part, on the relationship between the index of refraction of the coating material 22 and the minimum wavelength of incident light to be used in connection with the optical device 10. Further embodiments utilizing variations on the above relationship are described hereinafter.

The adhesive material 12 may be applied to the coating material 22. The thickness of the adhesive material 12 is preferably about 0.001 inches. The adhesive material 12 may be contact/pressure sensitive, in which event a release material 14 may be employed.

The optical device 10 of the present invention can be used in a wide variety of applications. For example, the invention may by used to provide an optical authentication feature on official documents to foil would-be counterfeitors. Alternatively, the optical device 10 of the invention could be used to obtain attractive decorative features on children's toys, point-of-purchase displays, specialized lenses or windows, or on various packages, such as plastic bags, bottles, etc.

Figure 2:
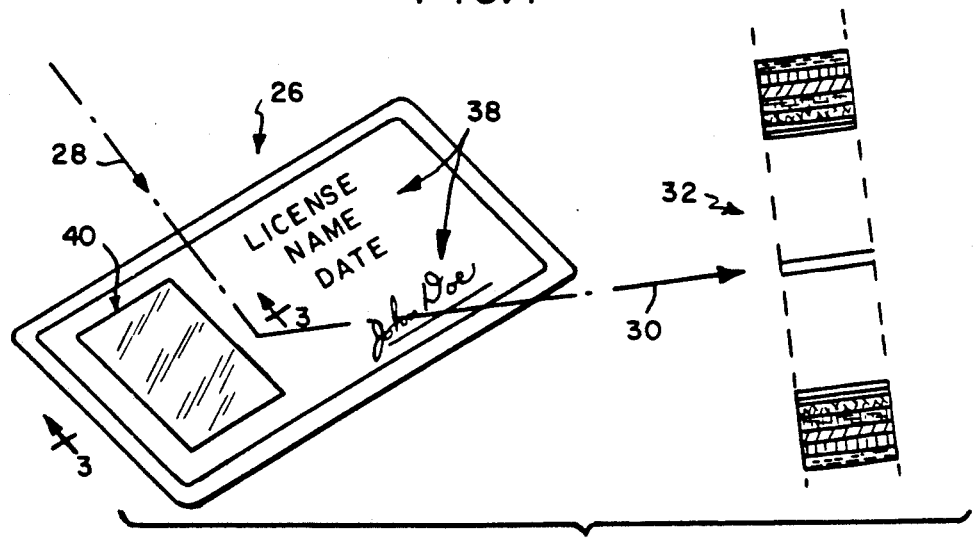
FIG. 2 is a diagrammatic perspective view of a personal identification item made from an optical device of the invention.
Figure 3:
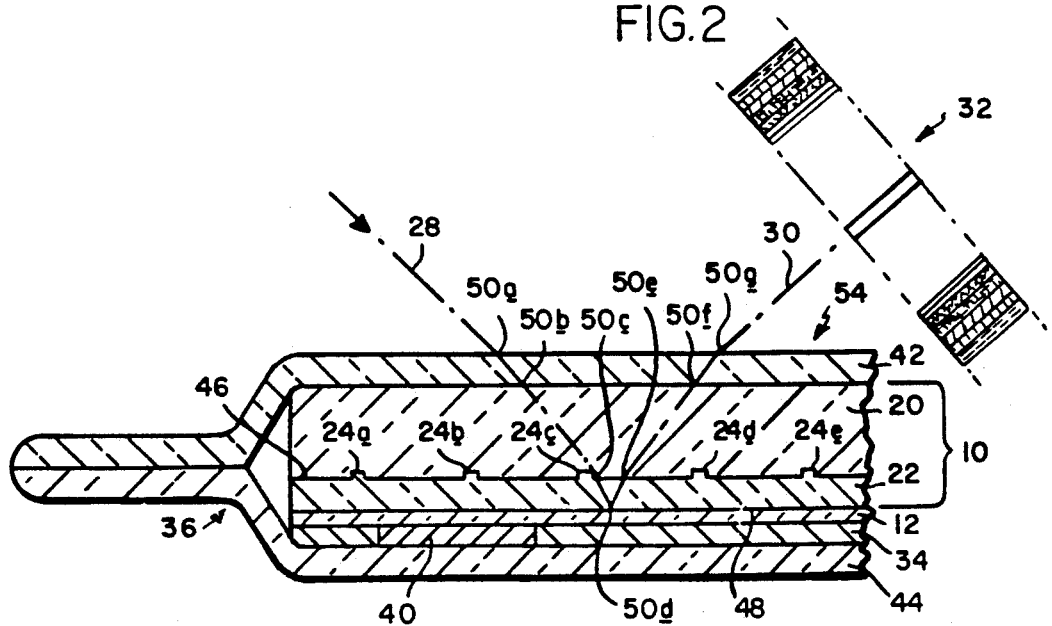
FIG. 3 is a cross-sectional view on an enlarged scale of the item shown in FIG. 2 taken along line 3—3 of FIG. 2.

FIGS. 2, 3 and 4 show an item of personal identification 26 employing an optical device 10 of the invention. Incident light is depicted at 28, and resultant light is depicted at 30. The resultant light 30 contains an optical image 32 in the form of a color spectrum as produced by the diffraction grating 16.

As can be best seen in FIGS. 3 and 4, the item 26 comprises the surface embossed material 20, the coating material 22, the adhesive material 12, an information layer 34, and an encapsulating material 36. The information layer 34 may, for example, contain personal data 38 and a photograph 40 of the card holder.

The encapsulating material 36 comprises a top layer 42 and a bottom layer 44. The layers 42 and 44 extend beyond the edges of the optical device 10 and the information layer 34, and adhere to each other upon lamination. The components are combined as illustrated in FIG. 4.

FIG. 3 diagrammatically illustrates the path most of the light travels as it passes into and out of an optical device. Initially, the incident light 28 refracts into the top layer 42 of the encapsulating material 36, and proceeds through the surface embossed material 20. The light then refracts through a first surface 46 of the coating material 22. Once there, it internally reflects off of a second surface 48 of the coating material 22 and refracts out through the first surface 46. At this stage the light passes through the optical interference pattern 16 and thus produces an optical image 32 which passes through the surface embossed material 20 and finally through the top layer 42 of encapsulating material 36. In the present embodiment, materials 20 and 36 have similar indices of refraction.

At each of the juncture planes 50a-50g through which light passes, some light is reflected back into the medium from which it travelled, and some light is refracted into the medium towards which the light is travelling. At juncture planes 50a-c and 50e-g most of the light is refracted, and at plane 50d most of the light is reflected. The remaining light not following the above described path is largely lost with respect to forming the optical image 32. The optical device 10 and the item 26 are designed to keep these and other losses to a minimum, in part, by using materials which are essentially clear.

The information 38, 40 contained within the information layer 34 should be visible through the encapsulating material 36, the surface embossed material 20, the coating material 22, and the adhesive material 12. This provides an optical item 26 with multiple optical functions, i.e., both the information 38, 40 and the optical image 32 may be viewed.

A dark translucent material could be used for any of the materials 12, 20, 22 and 36. A dark translucent material, however, would absorb much of the light which entered it and subsequently darken the view of information 38, 40 as well as the view of optical image 32. A colored translucent material would filter all colors of light except the color of the material. In alternative embodiments, either of these may be desired authentication features.

The viewing of the optical image 32 is limited to a certain range of viewing angles. This range of viewing angles is determined by the angle of incidence of the incident light 28 as measured from the surface 54 of top layer 42 of encapsulating material 36. Generally, incident light 28 entering the item 26 of FIGS. 2-4 will not produce the optical image 32 if the light 28 enters the top layer 42 of material 36 at too shallow of an angle. This provides a further authentication feature in that the optical image 32 is visible only within a certain range of viewing angles.

Those skilled in the art will appreciate that this feature is due to the critical angle associated with mediums 20 and 22, i.e., the angle beyond which light travelling through the more optically dense of the two mediums will not refract into the other less optically dense medium.

Specifically, with reference to the optical device 10 of the present embodiment, as shown in FIG. 3, there will be a critical angle associated with juncture plane 50e such that light travelling through the coating material 22 towards the embossed material 20 at an angle less than the critical angle (as measured from surface 46) will not refract into the embossed material 20. The range of angles by which the optical image 32 may be viewed is thus limited. The extent to which the index of refraction of the coating material 22 is larger than that of the embossed material 20 will impact the range of angles of viewability as well as the boldness/brightness of the optical image produced. Those skilled in the art will appreciate that there exist many variations on the present embodiment which may be used to provide a variety of optical authentication features.

If the indices of refraction of the embossed material 20 and the coating material 22 are the same, then the interference pattern 16 will effectively be lost and no optical image 32 will be produced. In this case the combined materials 20, 22 will optically act as one medium having one index of refraction and having no optical interference pattern 16.

In an alternative embodiment the index of refraction of the coating material 22 may be less than that of the embossed material 20. In this embodiment, however, there will be a critical angle associated with juncture plane 50c such that light travelling through the embossed material 20 towards the coating material 22 at an angle less than the critical angle (as measured from surface 46) will not refract into the coating material 22.

Another feature of the coating material 22 relevant to forming alternative embodiments of the invention relates to the required minimum depth of its deposition. Applicant has found that the minimum required thickness of the coating material 22 is related both to the type of incident light 28 which will be employed in using the optical device 10, and to the index of refraction of the coating material 22.

If the depth of deposition of the coating material 22 is less than one or two wavelengths, then there is likely to be a supplemental interference pattern produced by the light reflected off of the coating material interfering with the light emerging from the coating material. Applicant has found that the desired optical image is best produced in the present embodiment when the destructive effect of the supplemental interference pattern is minimized.

As those skilled in the art will appreciate, the supplemental interference pattern can be generally described by the following equation for maximum intensity:

$$2 \times d = (m + \tfrac{1}{2}) \times \lambda/\eta, \quad m = 0, 1, 2, \ldots$$

where d is the coating depth, $\lambda$ is the wavelength of the incident light, and $\eta$ is the index of refraction of the coating material 22. Applicant has determined that the destructive effect of the supplemental interference pattern is sufficiently minimized when the first maximum is avoided, i.e., when m=1 above. Thus the minimum depth of deposition of the coating material 22 is $$d = 0.75 \times \lambda_\eta, \text{ where } \lambda_\eta = \lambda/\eta.$$

The wavelength $\lambda_\eta$ is the wavelength of the incident light within the coating material. Consequently, for visible light, the minimum depth of deposition of the coating material 22, having $\eta = 1.75$, required for violet light (4000 Å) to contribute to forming the optical image is d=1714 Å. Similarly, the minimum depth of deposition required to allow red light (7000 Å) to contribute to forming the optical image is 3000 Å. Alternatively, for purposes of manufacturing uniformity, the depth of deposition could simply be set to a thickness greater then the above minimums; such as, for example, $d = \lambda/2$.

In alternative embodiments, similarly derived limitations exist for ultraviolet light having wavelengths ranging from about 10 Å to 4000 Å and infrared light having wavelengths ranging from about 7000 Å to 10,000,000 Å. Further embodiments could be used with incident light of different frequencies, and involve different coatings having different indices of refraction.

Yet another feature of the materials 20 and 22 relevant to forming alternative embodiments of the invention relates to whether the optical device 10 is designed to be transparent or opaque. The embodiment of the optical device 10 shown in FIG. 1 functions as an optical transmission device; that is the optical device 10 transmits light. The coating material 22, the surface embossed material 20, and the adhesive material 12 are each substantially transparent in this embodiment. The optical image 32 should appear if the device 10 is positioned between the viewer's eye and the light source.

Alternatively, the device of the invention could function as an optical reflection device. This could be achieved by including another layer of material which provides some reflectance, or the adhesive third material itself could be fabricated of a material which provides the some reflectance.

For example, FIGS. 2-4 show an optical device 10 which by itself functions as a transmission device, applied to an information layer 34 which provides some reflectance. This embodiment allows the optical device 10 to be used in a reflective fashion. The optical image 32 should appear if the device 10 is positioned such that it reflects light from the light source back towards the viewer's eye. Further embodiments could utilize various aspects of both reflectance and transmission properties.

FIGS. 5 and 6 illustrate another embodiment of the invention wherein an optical interference pattern is embossed onto a unit of packaging, specifically a bottle 56. A first material 58 of the bottle 56 is surface embossed with an optical interference pattern 60 on its outer surface 62. A second material 64 is deposited onto the embossed outer surface 62 of the bottle 56, thus preserving the grooves or holographic depletion regions 60.

As incident light 66 passes through the bottle 56 and emerges as resultant light 68 through the surface embossed pattern 60, the optical image 70 is produced and passes through the second material 64. In the embodiment shown in FIGS. 5 and 6, the optical interference pattern 60 is a holographic embossment and the resulting holographic optical image 70 includes the words "LOGO IMAGE". It is well known in the art that a very wide variety of images may be surface embossed and reproduced in such a manner.

It will be appreciated that modifications and changes may be made to any of the above described versatile embodiments without departing from the scope of the invention.

I claim:

1. An optical device through which incident light passes to produce a resultant light containing an optical image, said incident light including at least one component having a minimum wavelength, said optical device comprising:
   a first material having a first index of refraction and a surface engraved with a relief pattern, and a second material having a second index of refraction different than said first index of refraction, said second material being deposited onto said surface in the form of a continuous layer having an inner contoured surface which follows said relief pattern and an outer surface which in comparison to said inner surface is substantially smooth, said layer having a minimum depth of deposition at least equal to three quarters of said minimum wavelength component of said incident light within said second material.

2. An optical device as claimed in claim 1, wherein said index of refraction of said second material is greater then said index of refraction of said first material.

3. An optical device as claimed in claim 1, further comprising an adhesive third material applied to an exposed surface of one of said first and second materials.

4. An optical device as claimed in claim 3, further comprising a cover material releasably adhered to said adhesive third material.

5. An optical device as claimed in claim 3, wherein said adhesive third material is a contact adhesive.

6. An optical device as claimed in claim 1, wherein said depth of said second material is between about 1,500 Å and 10,000 Å.

7. An optical device as claimed in claim 1, wherein said embossed surface of said first material is substantially planar.

8. An optical device as claimed in claim 1, wherein said first material is an acrylic material.

9. An optical device as claimed in claim 1, wherein said second material is deposited via plasma deposition.

10. An optical device as claimed in claim 1, wherein said second material includes silicon dioxide.

11. An optical device as claimed in claim 1, wherein said optical interference pattern is a diffractive grating.

12. An optical device as claimed in claim 1, wherein said optical interference pattern is a holographic pattern.

13. An optical device as claimed in claim 1, wherein said incident light received by said device for producing said optical image is visible light.

14. An optical device as claimed in claim 1, wherein said incident light received by said device for producing said optical image is ultraviolet light.

15. An optical device as claimed in claim 1, wherein said incident light received by said device for producing said optical image is infrared light.

16. An optical device as claimed in claim 3, further comprising a fifth material adhered to said adhesive third material.

17. An optical device as claimed in claim 16, wherein said fifth material further includes information which may be authenticated by the production of said optical image responsive to said incident light.

18. A method of coating an embossed surface of a first material having a first index of refraction, said first material being capable of receiving an incident light and producing a resultant light containing an optical image, said incident light comprising at least one component having a minimum wavelength, said method comprising the step of:
   depositing a coating material having a second index of refraction different than said first index of refraction onto said embossed surface of said first material to a depth of deposition at least equal to three quarters of the minimum wavelength component of said incident light within said coating material.

19. An optical device through which incident light passes to produce a resultant light containing an optical image, said optical device comprising:
   a first material having a first index of refraction and a surface engraved with a relief pattern; and
   a second material having a second index of refraction different than said first index of refraction, said second material being deposited onto said surface in the form of a continuous layer having an inner contoured surface which follows said relief pattern and an outer surface which in comparison to said inner surface is substantially smooth, said second material having a minimum depth of deposition of at least 1714 Å.

20. A method of treating a surface of an acrylic material havig a first index of refraction, said method comprising the steps of:
   engraving said surface with a relief pattern configured to receive an incident light and to produce a resultant light containing an optical image; and
   depositing a coating material having a second index of refraction greater than said first index of refraction onto said surface of said acrylic material to form a coating layer having an inner surface which follows said relief pattern and an outer surface which is substantially smooth in comparison to said inner surface, and said coating layer having a minimum depth of deposition of at least 1714 Å.

* * * * *